Aug. 4, 1942.  F. J. SHOOK  2,291,659
TIRE BEAD REINFORCEMENT
Filed Jan. 13, 1941  2 Sheets-Sheet 1
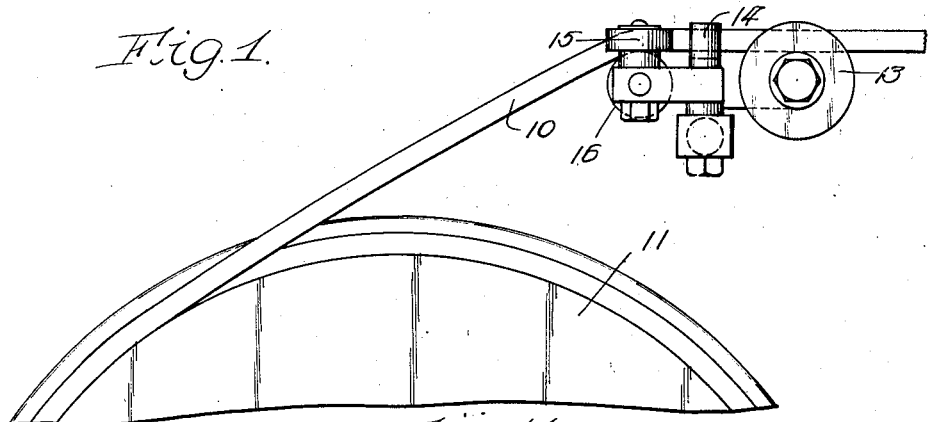
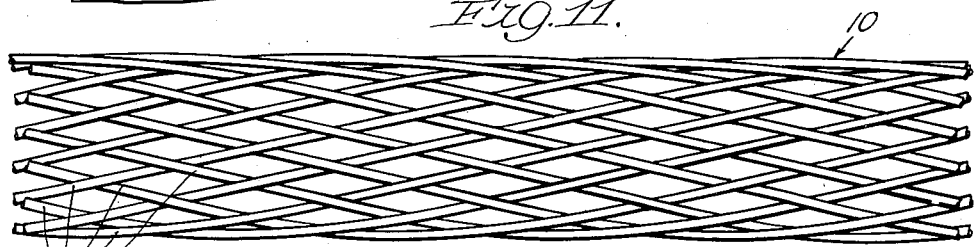
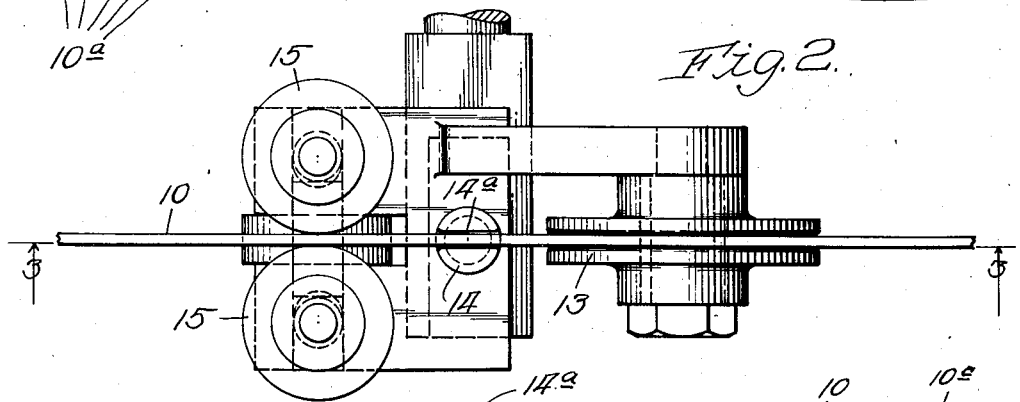
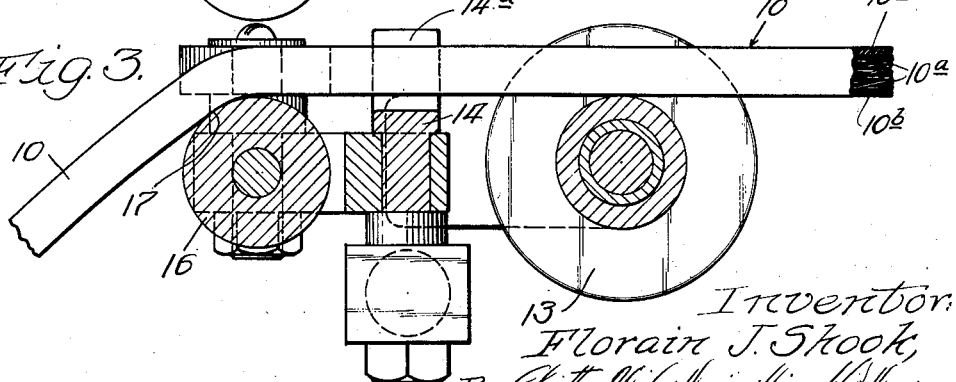
Inventor:
Florain J. Shook, Aug. 4, 1942.                F. J. SHOOK                2,291,659
                        TIRE BEAD REINFORCEMENT
                        Filed Jan. 13, 1941          2 Sheets-Sheet 2
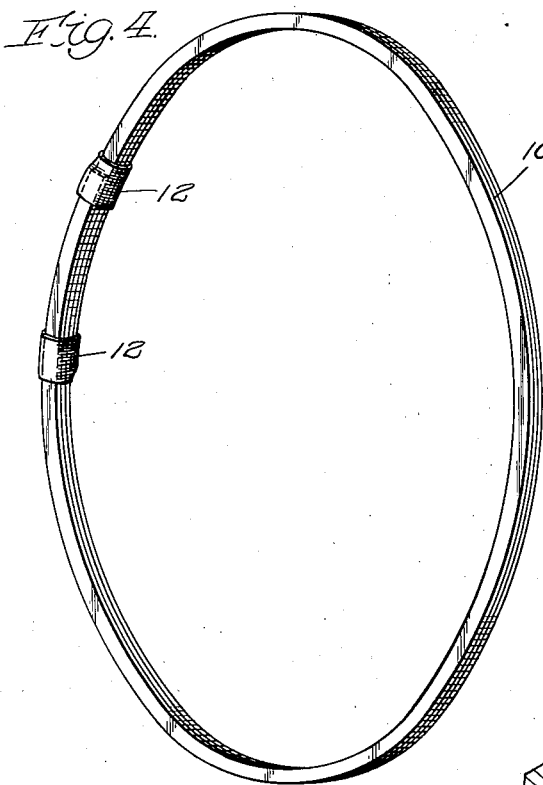
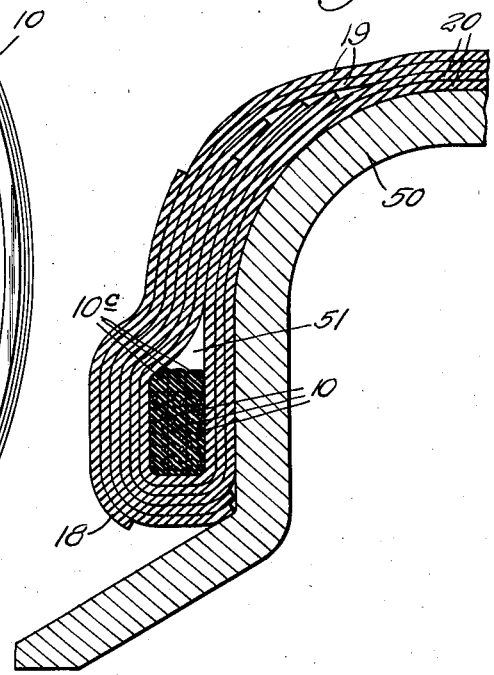
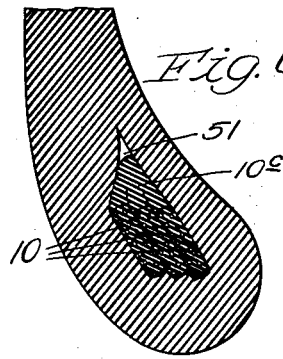
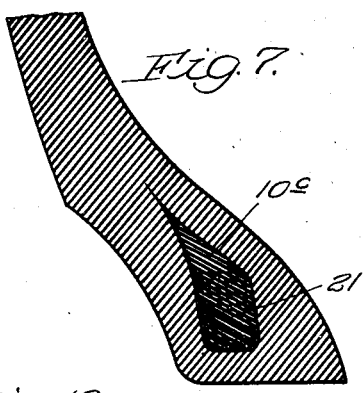
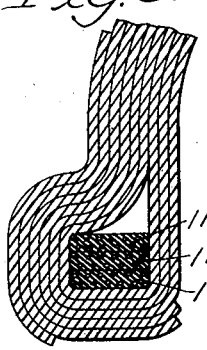
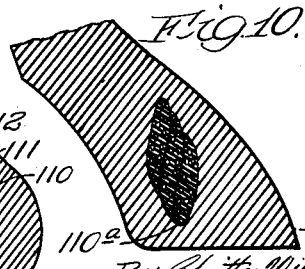

Patented Aug. 4, 1942

2,291,659

UNITED STATES PATENT OFFICE 2,291,659

TIRE BEAD REINFORCEMENT

Florain J. Shook, Akron, Ohio, assignor to National-Standard Company, a corporation of Michigan Application January 13, 1941, Serial No. 374,291

6 Claims. (Cl. 152—362)

This invention relates to improvements in tire bead reinforcement.

Among the features of my invention is the provision of a tire bead reinforcement comprising a flat braided wire tape laid on edge with a plurality of convolutions lying side by side.

Another feature of the invention is the giving of the tape a permanent set, in the plane of the tape, so that it will have a set curvature of substantially the same degree as it has when incorporated in the tire bead. This set curvature assists in placing the reinforcement in the tire bead on its edge with the convolutions side by side; and prevents any undue tendency of the reinforcement to shift in the completed bead.

I have found that with my improved reinforcement, since all the convolutions have the same inside diameter, there is very little or no tendency of the same to "spill" as in the case of the older constructions, when the pressure is applied to the bead during the curing process.

In the practice of my invention I have found it possible to add more convolutions to the reinforcement without increasing the outside diameter of the bead, thus holding the bead well below the rim flange.

In the practice of my invention it is also possible to add extra rubber on the top edge of the bead strands to fill the void above the bead when the tire is cured. This, in many cases, when using the older construction, was added separately, requiring an extra operation; and it has been found impracticable or impossible to add enough extra rubber to the thickness of the bead with a flat reinforcement to secure this result without making a bead in which, during the curing process, rearrangement of the rubber would cause serious difference of ultimate diameters.

In the practice of my invention it has further been found possible to decrease the time required for manufacture.

In the practice of my invention the tendency toward "cutting out" through the carcass under the bead in service is eliminated or lessened since with my new reinforcement all convolutions thereof are bearing substantially equally on the underplies, thus distributing the load. With the older flat construction the convolutions "spilled" with the result that the smallest convolution bore on the underplies with increased pressure with the result that "cutting out" was hastened.

Since my improved reinforcement is precured or preformed, the pressure from the water bag in curing tends to further compact the bead, insuring a solid unit with little or no tendency to misform in any direction.

By tape, I mean a tension member, the cross-section of which has one long axis and one short axis. In speaking of setting, curving, precurving, forming, or preforming the tape on edge I mean that it is given a permanent set, bend, or curvature in its own plane, that is in the plane of the long axes. I have found that braided wire tape can be precurved on edge without appreciably stretching or weakening the outer edge or compressing the inner edge. When a braided wire tape is precurved on edge, the curving is accomplished by making the bends in the inner edge more acute and those in the outer edge somewhat straighter, the wires in the tape shifting to permit this.

Other features and advantages of my invention will appear more fully as I proceed with my specification.

My invention is illustrated in the accompanying drawings in which Fig. 1 is a view in side elevation of a wire tape being given a precurvature on edge and wound onto a former drum; Fig. 2 is a top plan of the precurving device; Fig. 3 is a view taken as indicated by line 3 of Fig. 2; Fig. 4 is a view in perspective of the completed annulus or reinforcement, showing the same removed from the tire bead; Figs. 5, 6 and 7 are views showing in sequence the movement of the wires inside of the bead during the formation of the tire including the curing process; Figs. 8, 9 and 10 are similar views showing the same thing in connection with the older flat-wound reinforcement; and Fig. 11 is a diagrammatic view of the braided wire tape showing the same with the rubber coating removed and with the tape expanded to show more clearly the way the wires are braided.

As shown in the drawings, 10 indicates in general a tape having tensile strength and here shown, for example, as being made of braided wires coated with rubber. The tape itself is best shown in Fig. 3 where the wires are indicated by 10a and the rubber coating by 10b or 10c. For example, there may be thirteen wires, each having a diameter of substantially .025 inch, braided as shown in Fig. 11.

Several convolutions of the tape 10 are wound on edge side by side on the former drum 11 to make the annulus shown in Fig. 4. 12, 12 indicate binding strips wound around the annulus to assist in holding the ends of the tape in position.

The tape 10 is passed through a preforming device shown in Figs. 1, 2 and 3 to give it a set curvature on edge of substantially the same degree as it has in the completed annulus. Consequently, there will be no tendency for the ends to spring outwardly, but the convolutions will lie side by side and the entire annulus will be stable without any internal stresses or strains.

The precurving device here shown comprises a grooved guide roller 13 over which the tape is drawn. After leaving this it passes through the slot 14a in the guide stud and then between the guide rolls 15, 15. Under the latter is the forming roller 16 over which the tape 10 is rather sharply bent as indicated at 17. The roller 13, guide stud 14, and guide rollers 15 are to keep the tape on edge so that it will be bent on edge, that is in its own plane, over the roller 16. This bend is sharp enough so that it will retain a curvature substantially the same as the curvature in the completed tire bead and consequently the bend at 17 is somewhat more acute than the final curvature so that after it springs back slightly it will retain the desired curvature.

In Fig. 5 the annulus is shown just after an early step in the tire formation and before the curing. In this view 50 indicates the building drum, 18 the chafer strip, 19, 19 the overplies and 20, 20 the underplies on the inside of the tire. During the following steps in the manufacture of the tire as indicated diagrammatically in Figs. 6 and 7, the convolutions of the tape rotate slightly on their central axes; but since all the convolutions (and therefore the central axes) have an equal diameter and since there are no internal stresses and strains in the reinforcement itself, the convolutions will first assume the positions shown in Fig. 6 and then as shown in Fig. 7 with the result that there will be no tendency for any one convolution to move inwardly to any great extent. The result of this is that any rearrangement of the wires or convolutions results primarily in forming a reinforcement substantially rectangular in cross-section as indicated by 21 in Fig. 7. Such a reinforcement has very little, if any, tendency to cut through the carcass.

Merely for the purpose of emphasizing the advantage of my improved construction, I have shown in Figs. 8, 9 and 10 what ordinarily happens when a tape is wound flat-wise, that is, one convolution on top of another. As here shown, the three convolutions are indicated by 110, 111, and 112 from the inside outwardly. During the following steps in the manufacture of the tire as indicated diagrammatically in Figs. 9 and 10, the convolutions of the tape rotate slightly on their central axes; but since the inner convolution 110 has a smaller diameter than the others it will be seen by reference to Fig. 9 that such rotation causes one edge of the convolution 110 to move inwardly more than the others with the result that, as shown in Fig. 10, the completed reinforcement in cross-section becomes pointed or develops a knife edge 110a which comes from the inner edge of the smallest convolution 110. The sharp edge 110a of such completed reinforcement tends to cut through the carcass with resulting damage to the tire.

By reference to Fig. 3 it will be seen that the rubber coating 10c on the outer edge of the tape is considerably thicker than on the inner edge as indicated by 10b. There are several purposes served by this construction. By providing this extra rubber on the outer edge of the tape it is possible to add extra rubber on the top edge of the bead strands to fill the void above the bead when the tire is cured. In the older practice this was often added separately requiring an extra operation. Reference to Fig. 5 will show that this extra thickness of rubber 10c on the outer edge of the tape supplies a considerable amount of extra rubber which fills the V-shaped void 51 just above the annulus between the layers of fabric adjacent to it by having the rubber thinner on the inner edge of the tape as indicated by 10b. There is also not so much interference with the precurving of the tape as the rubber is very thin where the tape is bent over the forming roller 17 and consequently on this edge is not damaged by the roller. The thick rubber 10c on the outer edge does not contact on its edge any of the preforming rollers and consequently is not damaged.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new and desire to secure by Letters Patent is:

1. A tire bead reinforcement including a braided wire tape curved edgewise.

2. A tire bead reinforcement including a braided wire tape curved edgewise with a plurality of convolutions side by side.

3. A tire bead reinforcement as claimed in claim 1 in which the tape is covered with rubber, said rubber being thicker on the outer edge of the tape than on the inner edge.

4. A tire bead reinforcement as claimed in claim 2 in which the tape is covered with rubber, said rubber being thicker on the outer edge of the tape than on the inner edge.

5. A device as claimed in claim 1, in which the tape is curved edgewise to substantially the degree of curvature it will have in the bead of a completed tire.

6. A device as claimed in claim 2, in which the tape is curved edgewise to substantially the degree of curvature it will have in the bead of a completed tire.

FLORAIN J. SHOOK.